United States Patent [19]

Kitajima

[11] Patent Number: 4,652,094
[45] Date of Patent: Mar. 24, 1987

[54] BINOCULAR MICROSCOPE INCLUDING A DETACHABLE OPTICAL DEFLECTING UNIT

[75] Inventor: Nobuaki Kitajima, Tokyo, Japan
[73] Assignee: Tokyo Kogaku Kikai Kabushiki Kaisha, Tokyo, Japan
[21] Appl. No.: 789,032
[22] Filed: Oct. 18, 1985

[30] Foreign Application Priority Data

Oct. 23, 1984 [JP] Japan .......................... 59-159917[U]

[51] Int. Cl.⁴ .................... G02B 21/20; G02B 23/18; G02B 7/18
[52] U.S. Cl. .................................. 350/514; 350/516; 350/287; 350/519
[58] Field of Search .............................. 350/513–516, 350/522, 507, 502, 511, 145, 146, 287, 286, 319, 518, 519

[56] References Cited

U.S. PATENT DOCUMENTS

| | | | |
|---|---|---|---|
| 1,837,993 | 12/1931 | Patterson | 350/507 |
| 1,966,784 | 7/1934 | Bauersfeld | 350/287 |
| 4,361,379 | 11/1982 | Klein | |

FOREIGN PATENT DOCUMENTS

| | | | |
|---|---|---|---|
| 206242 | 1/1984 | German Democratic Rep. | 350/514 |
| 651367 | 3/1951 | United Kingdom | 350/514 |

OTHER PUBLICATIONS

TOPCON Operation Microscope–OMS-300 (Booklet).

Primary Examiner—Jon W. Henry
Attorney, Agent, or Firm—Cushman, Darby & Cushman

[57] ABSTRACT

A binocular microscope arrangement that can be used for both straight line and angular viewing. The microscope arrangement includes three main units: an objective lens unit, a deflection prism unit, and an ocular tube unit. Mounting Structures are provided at the light-outgoing side of the objective lens unit at boxer sides of the deflection unit and at the light-incoming side of the ocular tube unit can be directly coupled to the objective lens unit, or the deflecting prism unit can be interposed between the ocular lens unit and the objective lens unit.

6 Claims, 11 Drawing Figures

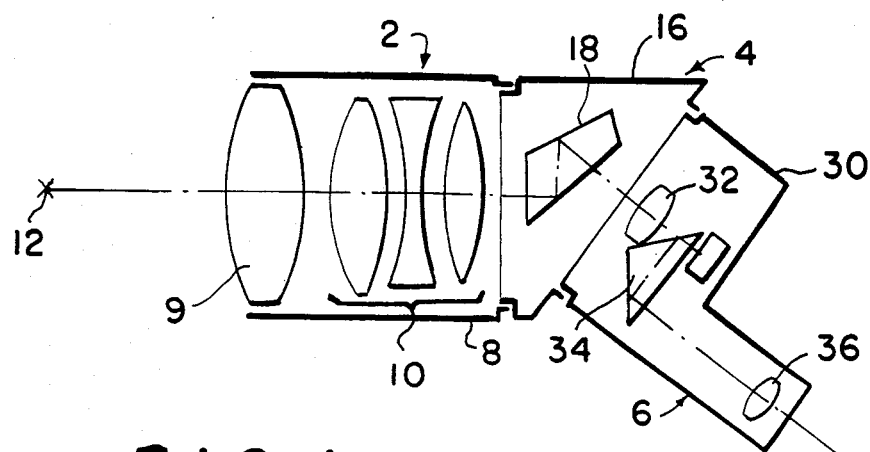
F I G. 1
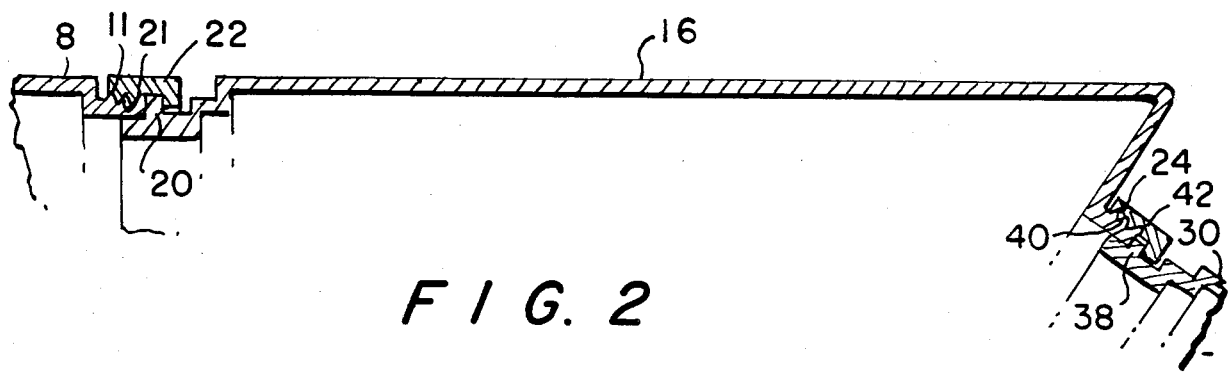
F I G. 2
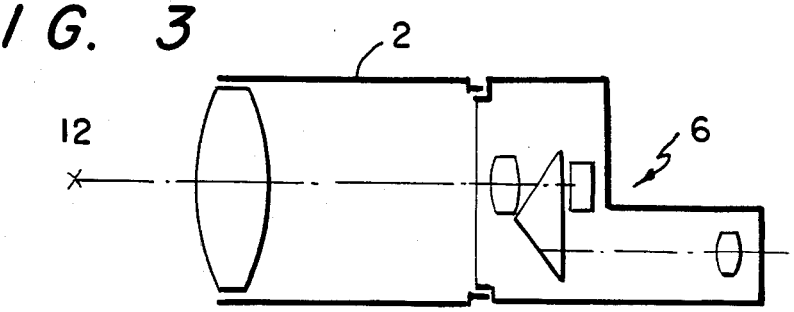
F I G. 3

4,652,094

BINOCULAR MICROSCOPE INCLUDING A DETACHABLE OPTICAL DEFLECTING UNIT

BACKGROUND OF THE INVENTION

This invention relates in general to binocular microscopes. The invention provides a binocular microscope structural arrangement including a detachable optical deflecting unit which can be attached for use in an inclined observation or detached for straight observation.

During ophthalmic surgery, a patient is in a lying down position with the eye being operated on facing "up". Preferably, an ocular lens axis of a binocular microscope, used to assist the surgeon, is inclined with respect to an objective lens axis so that the binocular microscope may be provided with an inclined binocular tube unit.

In otorhinolaryngologic surgery, neurosurgery or plastic surgery, however, an ocular lens axis of a binocular microscope is preferably aligned with that of the objective lens.

Accordingly, in order for a binocular microscope to be used for both types of surgeries, i.e. both inclined and straight observations, conventionally it is provided with an inclined binocular tube unit in addition to a straight binocular tube unit, or a variable optical axis type of a binocular lens unit.

The conventional binocular microscope has disadvantages in that, although an optical system of the inclined binocular lens unit is identical in configuration to that of the straight binocular lens unit, they can never be used in common. Also, the variable optical axis type of the binocular lens unit includes complicated optical elements and mechnical components making it expensive to manufacture.

SUMMARY OF THE INVENTION

It is therefore an object of the present invention to provide a binocular microscope arrangement including a binocular lens unit that can be commonly used for both inclined and straight observations.

Another object of the present invention is to provide a binocular microscope that is relatively simple in both optical and mechnical configurations compared with known arrangements.

A further object of the present invention is to provide a binocular microscope that is less expensive to manufacture than known arrangements. Other objects, advantages, and features of this invention will become apparent from the following description of one embodiment thereof, when read in connection with the accompanying drawings.

Briefly, the binocular microscope in accordance with the present invention comprises an objective lens unit for collimating and magnifying incident light from an object, which has first mounting means at an end portion of a light-outgoing side thereof; a detachable optical deflecting unit including second mounting means at an end portion of a light-incoming side thereof so as to be engaged with the first mounting means, and third mounting means at another end portion of a light-outgoing side thereof, which is identical in configuration to the first mounting means; and a binocular lens unit having a fourth mounting means at an end portion of a light-incoming side thereof, which is identical in configuration to the second mounting means.

BRIEF DESCRIPTION OF THE DRAWINGS

FIG. 1 shows schematically a sectional view of a 45° inclined observation type binocular microscope according to the present invention;

FIG. 2 illustrates an enlarged sectional view of mounts shown in FIG. 1.

FIG. 3 is a schematic sectional view of a straight observation type binocular microscope of the present invention;

FIGS. 4-7 are schematic sectional views of various deflecting units of the present invention wherein FIG. 4 illustrates a 90° inclined observation type deflecting unit, FIG. 5 depicts a 60° inclined observation type deflecting unit, FIG. 6 shows a 30° inclined observation type deflecting unit, and FIG. 7 also shown a 30° inclined observation type deflecting unit.

DETAILED DESCRIPTION OF THE PREFERRED EMBODIMENTS

Figure 4:
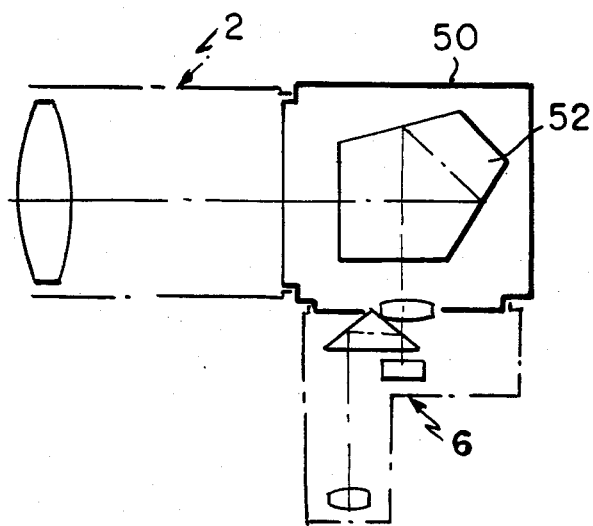

As shown in FIG. 1, the binocular microscope comprises an objective lens unit 2, an optical deflecting unit 4, and a binocular lens unit 6 (only one ocular lens unit is shown). Objective lens unit 2 includes an objective tube 8, an objective lens 9 and a pair of zoom lens systems 10. Objective lens 9 and zoom lens sytem 10 are supported by suitable means (not shown) in the objective tube 8. An object to be observed is positioned at the front (primary) focal point 12 of objective lens 9. Zoom lens system 10 magnifies and collimates incident light from the object through objective lens 9 so that the zoom lens system 10 may transfer parallel light flux to deflecting unit 4.

Objective tube 8 is provided with a male screw at the end portion thereof on the deflecting unit side as shown in FIG. 2. Male screw 11 functions as a first mounting means. Deflecting unit 4 includes a common deflection prism 18 disposed in a housing 16 wherein a deflection angle of the deflection prism 18 corresponds to an inclined angle of the binocular lens unit 6. In this embodiment, the deflection prism 18 may deflect incident light by 45° and the reflection number thereof is set to be even such as two, for instance, as shown in FIG. 1.

Housing 16 is provided at the end portion thereof on the side of the objective lens tube 8 with a stepped flange 20 which may come to contact with the terminating end of the objective lens tube 8 on a light-outgoing side. A rotatable screw mount 22 functioning in cooperation with the flange 20 as second mounting means has a female screw 21 which is engaged with the male screw 11 of the objective lens tube 8. A terminating end portion of the housing 16 is made L-shape and is provided with a screw mount 24 functioning as third mounting means, which is identical in configuration to the screw mount 11 of the objective lens tube 8.

Each of the binocular lens (eyepiece) unit 56 includes an image-forming lens 32, a porroprism 34 and an ocular lens 36 an ocular tube 30. The ocular tube 30 includes a stepped flange 38 at the front end portion thereof on a light-coming side, which may come to contact with the terminating end of the housing 16, and a rotatable screw mount 42 having a female screw 40 which is engaged with screw mount 24, which is preferably a male screw.

The flange 38 and the screw mount 42 together constitute and function as a fourth means for mounting which is substantially identical in configuration to the second mounting means.

The above configurations, which is only an example of the many configurations possible applying the principles of the present invention show a 45° inclined observation type binocular microscope. When, however, the female screws 22 and 42 are disengaged with the male screws 11 and 40, respectively, the deflecting unit 4 is removed from the binocular microscope and, then, the binocular lens unit 6 is directly connected with the objective lens tube 8 by the screw mount 42, the binocular microscope can be used as a straight observation type as shown in FIG. 3. Other embodiments will be described hereinbelow with reference to the drawings.

FIG. 4 shows schematically a 90° inclined observation type binocular microscope wherein a common 90° deflection prism 52 is arranged in a detachable deflecting unit 50.

Figure 5:
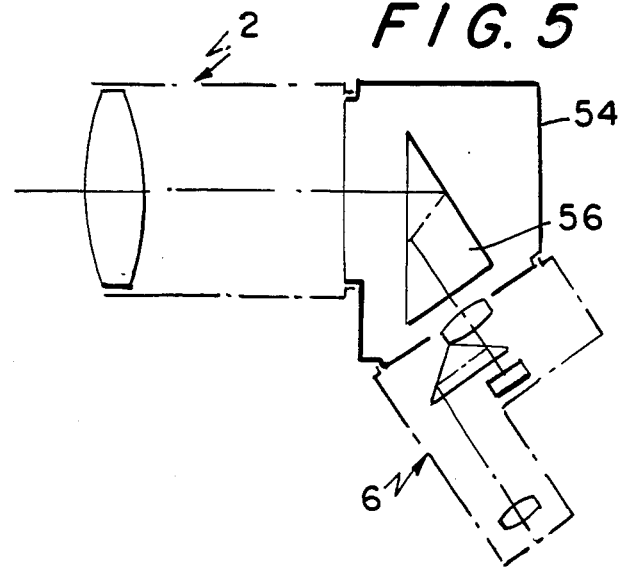

FIG. 5 shows schematically a 60° inclined observation type binocular microscope in which a common 60° deflection prisms 56 is disposed in a detachable deflecting unit 54.

Figure 6:
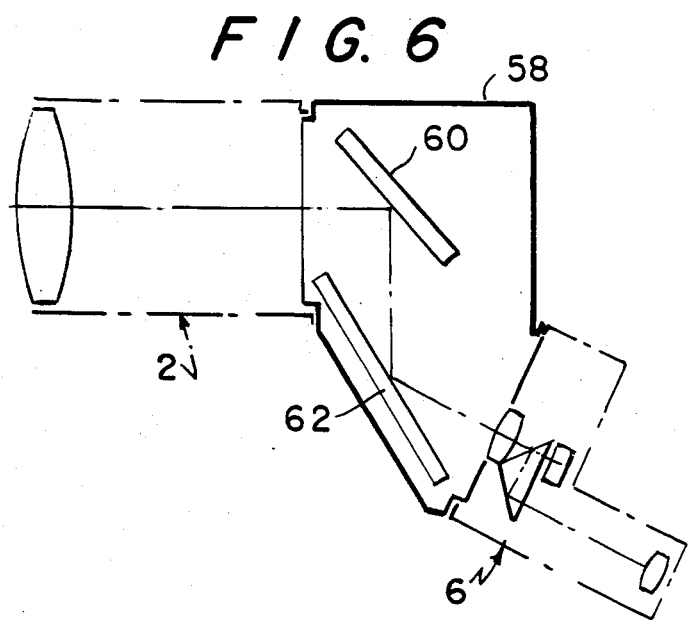

FIG. 6 illustrates schematically a detachable deflecting unit 58 especially adapted for use in a 30° inclined observation type binocular microscope, wherein two mirrors 60 and 62 with 30° optical axis deflection are arranged.

Figure 7:
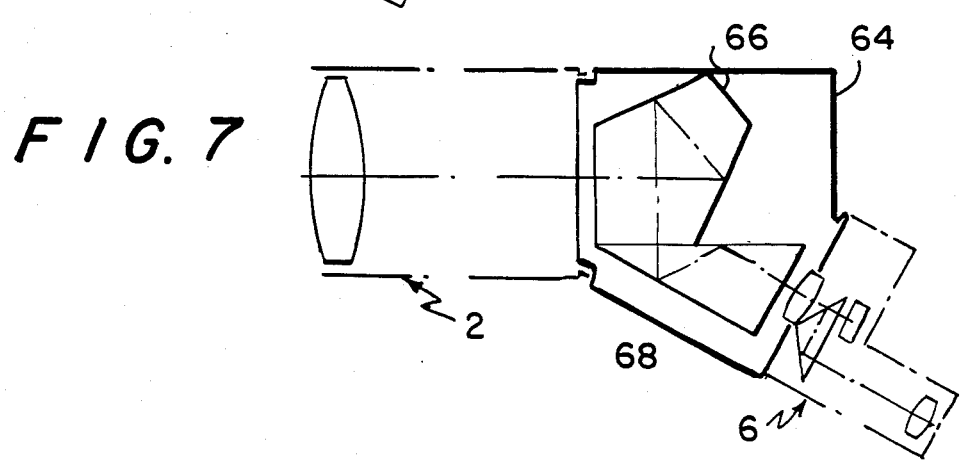
Figure 8A:
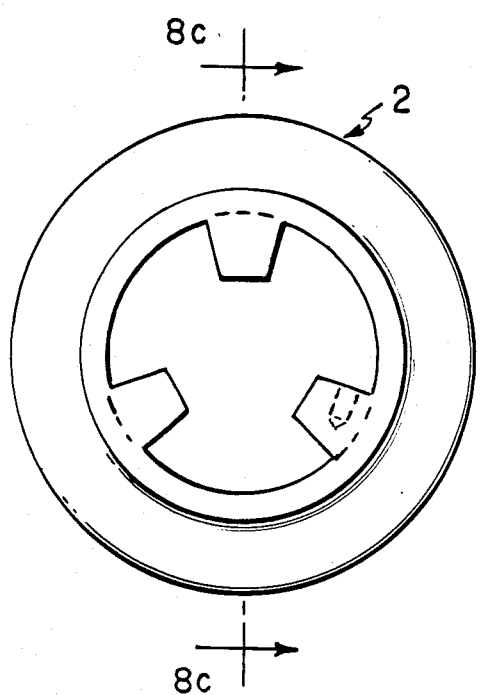
FIGS. 8A-8D show a bayonet mount as an alternative to the screw mount shown in FIG. 2.
Figure 8B:
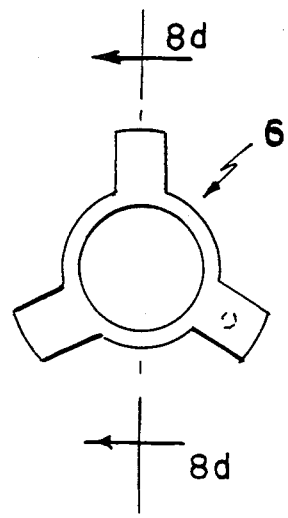
Figure 8C:
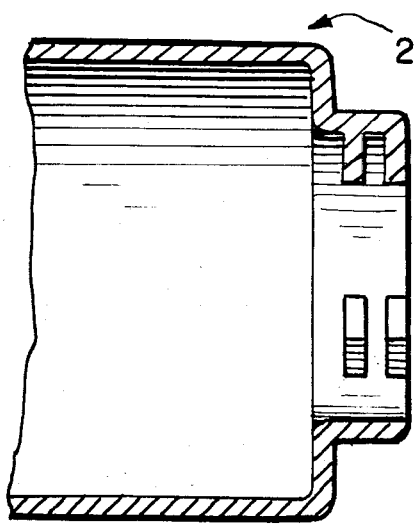
Figure 8D:
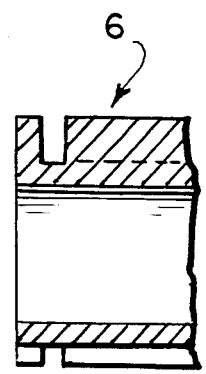

FIG. 7 shows schematically a 30° inclined observation type binocular microscope in which a detachable deflection unit 64 includes a common 90° deflection prism and a common 120° deflection prism 68.

The binocular microscope shown in FIGS. 4–7 can be also used as a straight observation type when removing the deflecting unit 50, 54, 58 or 64 therefrom.

In addition, it is noted that the number of reflection which occurs in the deflecting unit 50, 54, 58 or 64 is even.

FIGS. 8A–8D show a bayonet mount as an alternative of the screw mounts shown in FIG. 2.

A binocular microscope of the present invention has a detachable deflecting unit so that it can be used as an inclined observation type when the deflecting unit is in place while it can also be used as a straight observation type when the deflecting unit is not used.

Since a binocular lens unit can be commonly used in either case, a binocular microscope in accordance with the present invention has advantages in that it is not necessary to equip two kinds of binocular lens unit used in an inclined and straight observations, respectively, and it is much simpler in construction than a conventional binocular microscope so that its manufacturing cost is less expensive.

Other embodiments and modifications of the present invention will be apparent to those of ordinary skill in the art having the benefit of the teaching presented in the foregoing description and drawings. It is therefore, to be understood that this invention is not to be unduly limited and such modifications are intended to be included within the scope of the appended claims

What we claim is:

1. A binocular microscope comprising:
   an objective lens unit for collimating and magnifying incident light from an object, the objective lens unit having first means for mounting the objective lens unit at a light-outgoing side thereof;
   a detachable optical deflecting unit including a second mounting means provided at a light-incoming side thereof, said second mounting means being engageable with said first mounting means, said optical deflecting unit also having a third mounting means provided at a light-outgoing side thereof, the configuration of the third mounting means being identical to that of said first mounting means; and
   a binocular lens unit having fourth mounting means provided at a light-incoming side thereof, the configuration of said fourth mounting means being identical to that of said second mounting means, said forth mounting means being engageable with said third mounting means of said optical deflecting unit.

2. A binocular microscope according to claim 1 wherein said deflecting unit includes a deflecting prism the number of optical reflections of which is even.

3. A binocular microscope according to claim 1 whrein said deflecting unit includes an even number of reflection mirrors.

4. A binocular microscope according to claim 1 wherein said objective lens unit includes an optical magnification system.

5. A binocular microscope according to claim 1 wherein each of said first through fourth mounting means includes a screw mount.

6. A binocular microscope according to claim 1 wherein each of said first through fourth mounting means includes a bayonet mount.

* * * * *